(12) United States Patent
Paratore et al.

(10) Patent No.: US 6,259,044 B1
(45) Date of Patent: Jul. 10, 2001

(54) ELECTRONIC DEVICE WITH TACTILE KEYPAD-OVERLAY

(75) Inventors: Robert Paratore, Woodinville, WA (US); Thomas R. Benson, Philadelphia, PA (US)

(73) Assignee: Intermec IP Corporation, Beverly Hills, CA (US)

( * ) Notice: Subject to any disclaimer, the term of this patent is extended or adjusted under 35 U.S.C. 154(b) by 0 days.

(21) Appl. No.: 09/518,129

(22) Filed: Mar. 3, 2000

(51) Int. Cl.[7] .................................................. H01H 13/70
(52) U.S. Cl. ........................... 200/5 A; 200/517; 200/310; 200/314; 200/317
(58) Field of Search ..................... 200/5 A, 18, 512–517, 200/310–317, 341–345; 400/472, 490–496

(56) References Cited

U.S. PATENT DOCUMENTS

| | | | |
|---|---|---|---|
| 4,092,527 | * | 5/1978 | Luecke ................................. 364/709 |
| 4,644,326 | * | 2/1987 | Villalobos et al. .............. 340/365 R |
| 4,758,699 | * | 7/1988 | Ciriscioli .......................... 200/159 R |
| 5,172,805 | * | 12/1992 | Gumb ................................... 200/341 |
| 5,359,658 | * | 10/1994 | Goodson .............................. 379/447 |
| 5,561,278 | * | 10/1996 | Rutten ................................ 200/50 A |
| 5,900,599 | * | 5/1999 | Ohashi et al. ...................... 200/5 A |
| 5,934,450 | * | 8/1999 | Rynk et al. .......................... 200/308 |
| 5,960,942 | * | 10/1999 | Thornton ............................. 200/314 |
| 6,084,190 | * | 7/2000 | Kenmochi ............................ 200/341 |

* cited by examiner

Primary Examiner—Michael Friedhofer
(74) Attorney, Agent, or Firm—Seed IP Law Group PLLC

(57) ABSTRACT

A keypad-overlay for use with an electronic device. The electronic device has a plurality of keys or signal input members coupled to electronic components within a housing of the electronic device. The signal input members have key indicia that identify key strokes usable in operation of the electronic components. The keypad-overlay is removably positioned adjacent to the signal input members. The keypad-overlay has a plurality of translucent cover members each positioned over a respective key indicia within the key indicia being visible to a user through the translucent cover member. The cover members have tactile indicators that provide a tactile indication to a user that the cover member has depressed a selected distance to accomplish a key stroke. The cover members have a key-activating protrusion positioned to engage and activate the key when the cover member is depressed toward the key.

29 Claims, 3 Drawing Sheets

ELECTRONIC DEVICE WITH TACTILE KEYPAD-OVERLAY

TECHNICAL FIELD

The present invention relates to electronic devices, and more particularly to protective components for use with electronic devices.

BACKGROUND OF THE INVENTION

Conventional electronic devices, and particularly hand-held electronic devices, have user interfaces in the form of a keyboard or a touch-sensitive screen having a keypad area. The keyboards and touch-sensitive screens typically include many keys, with each associated indicia, such as alphanumeric characters, visible to an operator during use of the electronic device. Keypads for electronic devices have been developed wherein each key is associated with multiple key-stroke functions. As a result, fewer keys are required for the keyboard, thereby allowing for efficient use of space for the keypad.

Typically a key in a keypad has indicia either printed on it or positioned relative to the key so as to be visible to a user. Because each key is usable for multiple input functions, each key is typically activated more frequently than if the key had a single input function. With increased use of the keys, the printed indicia on the keys can be worn off or obscured over time, such as from a user's finger pressing on the keys. The keys also have a tendency to get dirty from use over time. The touch-sensitive screens also experience excessive wear in the keypad area, and the screen can get dirty and visually obscured with use over time.

One way to avoid the drawbacks of dirty keys or touch-sensitive screens on an electronic device is for the operator to use gloves. A gloved finger can also reduce the amount of wear on the key's indicia. A disadvantage experienced when the operator uses gloves is that the glove reduces the operator's touch sensitivity during use of the keypad. Accordingly, the glove can make it difficult for an operator to know when a key has been sufficiently pressed to register a key stroke.

Tactile indicators have been used with keys to provide the operator with an indication of a completed key stroke. If the tactile indicator is too stiff, such that an elevated force is required to execute a key stroke, the keys can be difficult to use and the keys can be damaged if an excessive force is applied to the keys. The problems associated with improper tactile feedback, especially with a gloved hand, is exacerbated when using a touch-sensitive screen because such screens typically do not include tactile feedback devices. As a result, a touch-sensitive screen may be susceptible to damage from excessive pressure when the operator presses the key in an effort to register a key stroke.

SUMMARY OF THE INVENTION

The present invention solves the above problems and provides additional benefits not recognized by the prior art. One aspect of the invention embodies a keypad-overlay for use with an electronic device. The electronic device has a housing and a display is coupled to the housing. A plurality of keys or signal input members are coupled to electronic components contained in the housing. The signal input members include key indicia that provide an indication of key strokes usable in operation of the electronic device. The keypad-overlay is positioned adjacent to the keypad to removably cover the keys. They keypad-overlay includes a web and a plurality of translucent cover members projecting from the web, so each cover member is positionable over a selected key. The translucent cover members are configured so the key indicium associated with the keys are visible to an operator through the keypad-overlay. The cover members have an activator member positioned to engage a selected key to perform a key stroke. The cover members also have tactile indicators that provide a tactile indication to an operator that the cover member has been depressed sufficiently to accomplish a selected key stroke.

In one aspect of the invention, the plurality of signal input members form a keypad separate from the display, and the keypad-overlay is removably positioned over the keypad. The display is a touch-sensitive screen, and the keypad with the key indicia is provided on the display. The keypad-overlay is removably positioned over the touch-sensitive screen in a position corresponding to the keypad. In another aspect, the cover members are resilient, collapsible dome-shaped members, each movable from a raised position to a collapsed positioned when a selected force is applied to the cover member. The cover member provides tactile feedback to an operator when the cover member moves from the raised position to the collapsed position. The cover members are biased toward the raised position.

DETAILED DESCRIPTION

The following description sets forth certain specific details to provide a thorough understanding of various embodiments of the invention. However, one skilled in the art will understand that the information may be practiced without these details. In other instances, well-known structures associated with electronic devices, and more specifically, hand-held electronic devices, have not been shown or described in detail to avoid unnecessarily obscuring the description of the embodiments of the invention.

Figure 1:
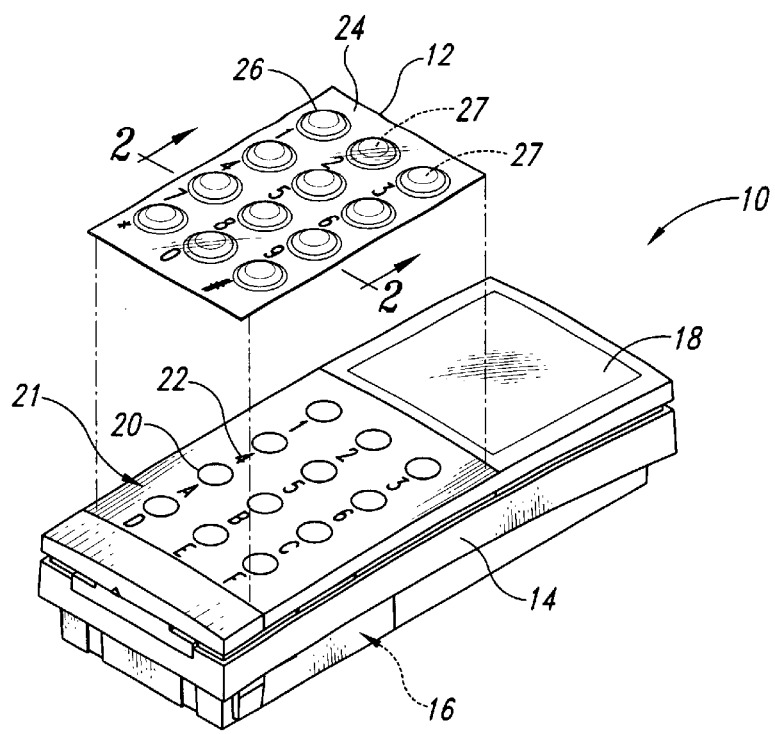
FIG. 1 is a partially exploded front isometric view of a hand-held electronic device having a display, a touch-sensitive keypad adjacent to the display, and a keypad-overlay positionable over the keypad in accordance with an embodiment of the present invention.

FIG. 1 shows a hand-held electronic device 10, such as a hand-held computer, or a symbology reader, that removably receives a keypad-overlay 12 in accordance with an embodiment of the invention. The electronic device 10 includes a housing 14 that contains electronic components 16 coupled to a display assembly 18 in a conventional manner. The electronic device 10 also includes a plurality of touch-sensitive keys 20 forming signal input members coupled to the electronic components 16. Each key 20 is connected to a switch assembly moveable from open and closed positions in a conventional manner for activation of the electronic components 16 within the housing 14 (FIG. 1). The plurality of keys 20 form a touch-sensitive keypad 21 usable by the operator for control or activation of the hand-held electronic device 10. In an illustrative embodiment, when a key 20 is depressed by the operator, a readout or the like is provided on the device's display assembly 18 so it is readable by the operator.

The keys 20 each include key indicia 22, such as letters, numbers, or other symbols, that provide an indication to an operator as to the one or more functions of the respective key. In the illustrated embodiment, the key indicia 22 is printed directly on the key 20. In alternate embodiments, the key indicia 22 is printed adjacent to a respective key 20. In another embodiment, the keys 20 are multifunction keys, the key indicium 22 includes indicia printed on the respective key for at least one function. Other indicia is printed adjacent to the respective key 20 for the other function(s).

The keypad-overlay 12 of the illustrated embodiment is a thin thermoplastic material having a substantially planar web portion 24 and a plurality of translucent cover members 26 projecting away from the web portion. The cover members 26 are integrally connected to the web portion 24 and positioned to extend over a respective key 20. Accordingly, the cover members 26 cover and protect the keys 20 on the keypad 21 when the keypad-overlay 12 is removably positioned over the keypad.

The cover members 26 are sufficiently translucent so the key indicia 22 on the key 20 is visible to the operator through the cover members 26 when the keypad-overlay 12 is in place on the keypad 21. In an alternate embodiment, the cover members 26 are fully transparent for a substantially unobstructed view of the keys 20 and the key indicium 22. In another embodiment, the cover members 26 can have different colorings or designs to provide various visual indications to the operator with respect to the key indicium 22 or the keys 20 under the cover members. In yet another embodiment, the keypad-overlay 12 can provide additional indicium on the cover members 26 or on the web portion 24 adjacent to the cover members, wherein the indicia corresponds to one or more key stroke functions of the respective key 20 under the cover member.

Figure 2:
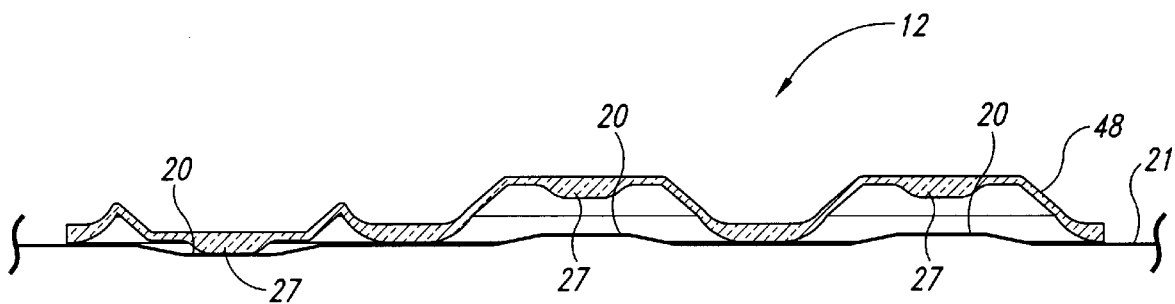
FIG. 2 is an enlarged cross-sectional view taken substantially along line 2—2 of FIG. 1.

As shown in the cross-sectional view of FIG. 2, the translucent cover members 26 are substantially dome-shaped, resiliently collapsible members moveable from a raised position to a collapsed position Each cover member 26 includes an integral activating puck 27 positioned in the convex portion and extending toward the respective touch-sensitive key 20. The activating puck 27 is positioned substantially along a central axis of the respective key 20. In the collapsed position, the cover member's activating puck 27 presses against its respective key 20 to activate the key. In the raised position, the cover member's activating puck 27 is spaced slightly apart from its respective touch-sensitive key 20. Accordingly, the dome-shaped cover member 26 forms a resilient, collapsible, convex "snap dome" that contains the interior activating puck and is biased toward the raised position.

The cover member 26 is moveable from the raised position toward the respective key 20, and the cover member snaps to the collapsed position when a sufficiently high force is applied on it. As the operator presses on the cover member 26 and the exerted force reaches a predetermined level, the cover member quickly moves to the collapsed position with a snapping action that creates a high tactile indication to the operator of such movement. When the cover member 26 snaps to the collapsed position, the cover member's activating puck 27 presses against its respective key 20 with a sufficient force to activate the key.

The cover members 26 of the illustrated embodiment are constructed to snap to the collapsed position at a selected force slightly greater than the force needed to activate the respective keys 20 on the electronic device 16. Accordingly, when the force is great enough to snap the cover member 26 to the collapsed position, the resulting force exerted on the key 20 is sufficient to activate it. When the cover member 26 begins its snap action toward the collapsed position, the cover member moves so quickly that the operator typically cannot reduce pressure on the cover member fast enough to prevent activation of the respective key 20 during normal operation. As a result, the cover member 26 provides a crisp, high tactile indication to the operator of the activation of the key 20 during operation.

Although the illustrated embodiment uses cover member 26 with a snap dome configuration, other tactile members can be utilized to provide the crisp or high tactile indication to the operator. For example, other suitable tactile devices can include a resilient buckling element that will buckle and create the tactile indication. Another tactile indicator includes a resilient, collapsing beam element that will collapse and create the tactile indication when sufficient force is exerted thereon. These devices return to the unbuckled or uncollapsed positions when the force is removed.

The thermoplastic keypad-overlay 12 of the illustrated embodiment covers the keypad 21 and protects the keys 20 from dust, debris, water, or the like that may be encountered during use of the hand-held electronic device 10. The keypad-overlay 12 also provides a barrier layer over the keys 20 that protects the key indicia 22 from being rubbed off or excessively worn by an activating member, such as the operator's finger, during extended use of the electronic device 10. The keypad-overlay 12 also provides a barrier that protects the keys 20 from oils, grease, grime, or other contaminants that can soil keypad during operation of the electronic device over time. Thus, the keypad-overlay 12 helps to extend the life of the electronic device's keypad 21.

The keypad-overlay 12 is removably attached to the electronic device 10 such that, if the keypad-overlay becomes worn, damaged, or otherwise needs to be changed, it can be quickly and easily replaced with a new keypad-overlay. Alternatively, when a different keypad-overlay 12 is needed or desired, as an example, because the keypad-overlay has selected coloring or key indicia on the cover members 20, the keypad-overlay can be removed and replaced in a very quick and efficient manner without substantial idle time for the hand-held electronic device 10.

Figure 3:
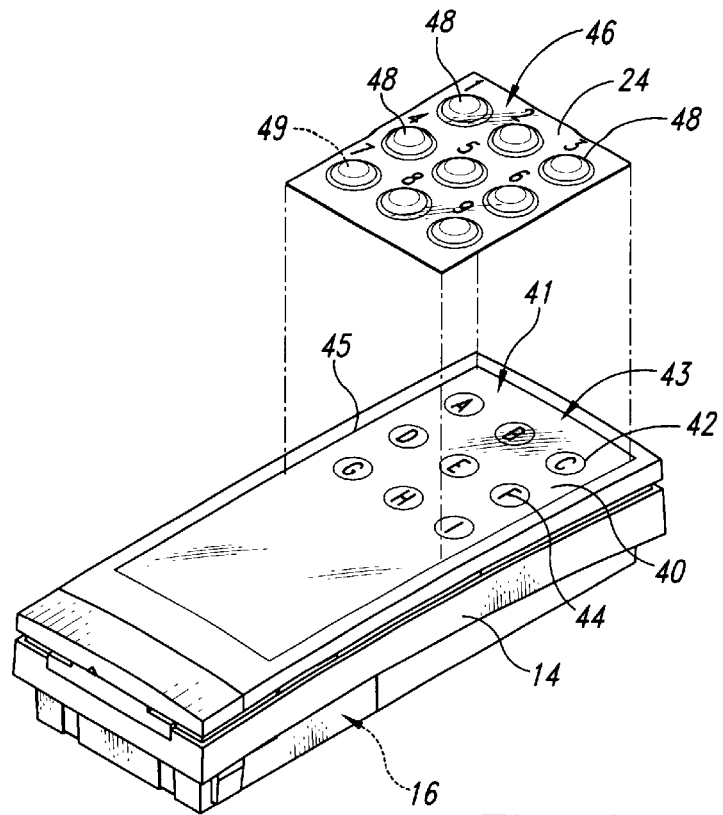
FIG. 3 is a partially exploded front isometric view of a hand-held electronic device having a touch-sensitive screen with a keypad displayed thereon and a keypad-overlay positionable on the touch-sensitive screen in accordance with an alternate embodiment of the present invention.

In an alternate embodiment illustrated in FIG. 3, the hand-held electronic device 10 includes the housing 14 and a display 41 having a conventional touch-sensitive screen 40 with a plurality of keys 42 coupled to the electronic components 16 within the housing 14. The plurality of keys 42 define a touch-sensitive keypad 43. The display 41 and the touch-sensitive screen 42 provide key indicia 44 for the keys 42 to provide an indication to the operator about the function of the respective keys.

The display 41 has a perimeter frame portion 45 extending around the touch-sensitive screen 40. The perimeter frame portion 45 is slightly raised around the touch-sensitive screen 40. The perimeter of the keypad overlay 12 is shaped and sized to substantially correspond to the shape and size of the touch-sensitive screen 40 within the raised frame portion 45. Accordingly, the raised frame portion 45 provides a blocking shoulder that substantially prevents the keypad-overlay 12 from sliding on the touch-sensitive screen 40 during use. The keypad-overlay 12 is constructed of the thermoplastic material that is stiff enough so the web portion will not substantially buckle or bow if pressed laterally against the frame portion 45. Accordingly, the keypad-overlay 12 remains in position over the display's keypad 43.

The keypad-overlay 12 in this alternate embodiment has a generally planar web portion 46 and plurality of the resilient, collapsible dome-shaped cover members 48 that protrude away from the web portion. The cover members 48 are positioned so as to cover the touch-sensitive keys 42 when the keypad-overlay 12 is positioned on the display 41. The cover members 48 include the activating puck 49 in approximately the middle of the dome-shaped member so the puck projects toward the respective key, as discussed above. The cover members 48 are dome-shaped snap members, as discussed above, that provide the high tactile feedback to the operator as the cover members move from the raised position to the collapsed position. As the cover members 48 snap to the collapsed position, the force exerted on the respective touch-sensitive key 42 by the activating puck 49 is sufficient to activate the respective key, thereby controlling operation of the electronic device 10.

The high tactile feedback provided by the cover members 48 is highly beneficial in this embodiment used with the touch-sensitive screen 40. The high tactile feedback provided by the cover members 48 let the operator know when the respective keys 42 have been activated. The activating puck 49 is slightly compressible, so it can be compressed if excessive force is applied to the cover member 48 during a key stroke. Accordingly, the snap action of the cover member 48 and the compressible activating puck 49 helps avoid the operator from pushing too hard and damaging the touch-sensitive screen 40.

In one embodiment, the key indicia 44 is provided on the touch-sensitive screen's display 40 adjacent to or on the keys 42. The cover members 48 on the keypad-overlay 12 are translucent so that the operator can see the key indicium 44 through the keypad-overlay. In one embodiment, the cover members 48 are transparent. In alternate embodiments, as discussed above, the keypad-overlay 12 or selected cover members 48 thereon can have different indicia 44 thereon or have different colorations provided as the indicia for the selected keys 42.

Figure 4:
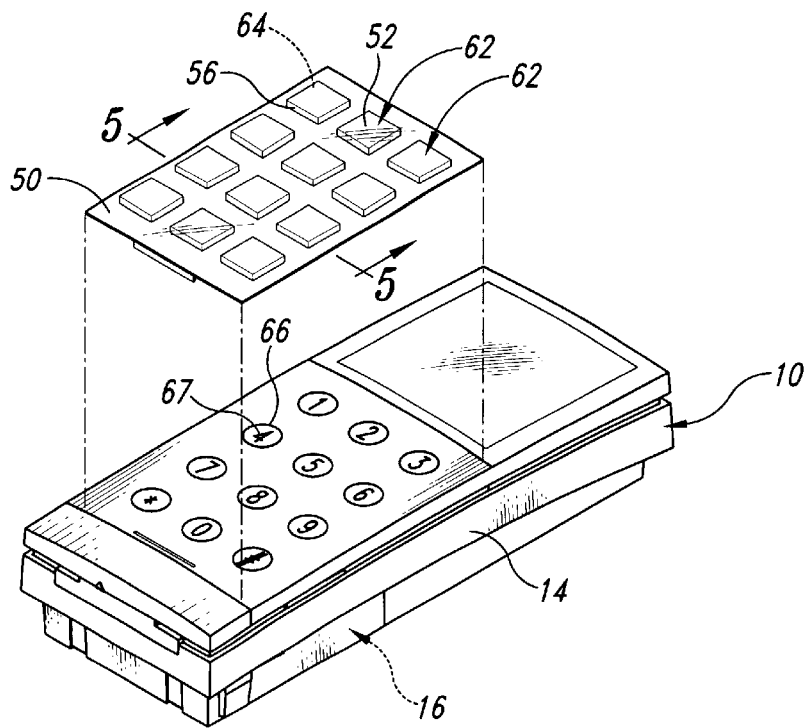
FIG. 4 is a partially exploded isometric view of an electronic device and a keypad-overlay in accordance with an alternate embodiment of the invention.

In an alternate embodiment illustrated in FIG. 4, a keypad-overlay 50 is adapted to provide a protective barrier over a portion of the electronic device 10 and is usable to activate the electronic components 16 within the electronic device. In this embodiment, the electronic device 10 has a plurality of touch-sensitive keys 66 coupled to the electronic components 16 within the electronic device 10. The keys 66 have key indicium 67 that indicate the function of the respective key.

The keypad-overlay 50 includes a web portion 60 with the plurality of generally square-shaped cover members 62 that have closed top sides 52, open bottom sides 54 and collapsible side walls 56 extending the top and bottom sides. Accordingly, the cover members form open-sided collapsible cubes positionable over the touch-sensitive keys 66. Other geometric configurations (e.g., rectangular, pyramidal, polygonal, etc.) can be used in alternate embodiments.

Figure 5:
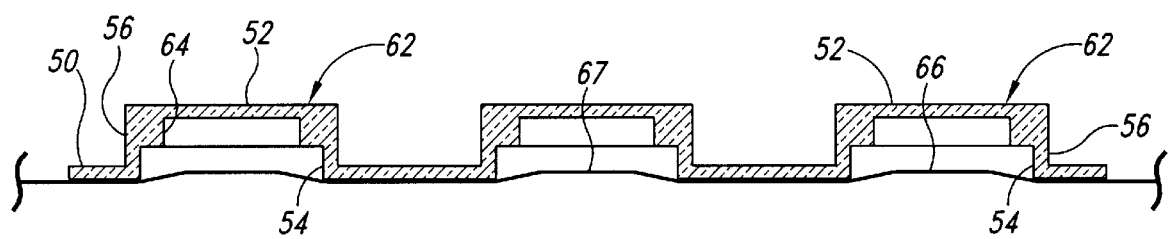
FIG. 5 is an enlarged cross-sectional view taken substantially along line 5—5 of FIG. 4.

As best seen in FIG. 5, each of these square cover members 62 also includes key-activating pucks 64 connected to the perimeter of the closed top-side 52 and to the collapsible sidewalls 56. The key-activating pucks 64 are positioned substantially concentrically about the cover member's central axis, extend toward the respective key 66, and are spaced slightly apart from the outer portion of the key when the cover member 62 is in a raised position. The pucks 64 are positioned so that when a cover member 62 is depressed from the raised position toward a collapsed position, the pucks press against an outer portion of the respective key member 66 so as to activate the key and perform a key stroke.

In this alternate embodiment, the cover member's closed top side 52 is translucent so the operator can see the key indicia 67 of the respective key 62 through the cover member's center portion. The pucks 64 do not obscure the operator's view of the indicia through the center of the cover member. In one embodiment, the cover member's closed top-side 52 is transparent. In another embodiment, the closed top-side 52 is tinted with a selected color, such as yellow, red, white, blue, etc. The coloration provide the operator with an indication of the general or specific function of the key or keys. In another embodiment, the cover members 66 include indicia thereon, such as on the closed top-side 52 or on one or more of the collapsible sidewalls 56.

When a cover members 62 in this alternate embodiment is pressed with a selected force and moved from the raised position toward the collapsed position, the collapsible sidewalls 56 buckle and the puck 64 presses against the respective key 66. This buckling of the collapsible sidewalls 56 provides the operator with a high tactile indication as to activation of the respective key 66. The collapsible sidewalls 56 are resilient so as to bias the cover members 62 toward the raised position after the cover member is collapsed by the operator. In an alternate embodiment other biasing members, such as springs, elastomeric blocks, or the like, are connected to the cover members 62 to bias the cover member to the raised position.

In the embodiments discussed above, the keypad-overlay 12 can be a thermoplastic material with translucent or transparent cover members. The keypad-overlay 12 can also be made of other materials that allow for the cover members to provide high tactile feedback, while also allowing the operator to see the key indicium 67 when the keypad-overlay is positioned on the electronic device. The keypad-overlay 12, in an alternate embodiment, provides a plurality of cover members 62 that correspond to a selected set or array of keys on the electronic device. Other keys on the electronic device 10 are covered by the keypad-overlay's web portion 60 to effectively inactivate use of those keys for a selected operation of the hand-held electronic device 10.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to electronic devices, not necessarily limited to the exemplary hand-held electronic devices generally described above.

These and other changes can be made to the invention in light of the above-detailed description. In general, in the following claims, the terms should not be construed to limit the invention to the specific embodiments disclosed in the specification and the claims, but should be construed to include all keypad-overlays combinable with an electronic device that operate in accordance with the claims to provide the electronic device and/or keypad-overlay.

From the foregoing, it will appreciated that, although specific embodiments of the invention have been described herein for purposes of illustration, various modifications may be made without deviating from the spirit and scope of the invention. Accordingly, the invention is not limited by the disclosure, but instead its scope is to be determined entirely by the following claims.

What is claimed is:

1. A hand-held electronic device, comprising:

a housing with a plurality of electronic components therein;

a display coupled to the housing;

a plurality of signal input members with key indicia identifying key strokes usable in operation of the electronic components;

a keypad-overlay removably positioned adjacent to the signal input members, the keypad-overlay having a plurality of translucent cover members each positioned over the respective key indicia with the key indicia being visible to an operator through a respective translucent cover member, the cover members having tactile indicators providing a tactile indication to the operator that a respective cover member has been depressed a selected distance to accomplish a key stroke, the cover members having a key-activating projection positioned to engage a selected signal input member when the cover member has been moved to accomplish the key stroke.

2. The device of claim 1 wherein the plurality of signal input members are on the display and the keypad-overlay is positioned adjacent to the display.

3. The device of claim 1 wherein the display is a touch-sensitive screen and the key indicia are on the display, the keypad-overlay is removably positioned on the touch-sensitive screen.

4. The device of claim 1 wherein the cover members are transparent.

5. The device of claim 1 wherein the key-activating projection is positioned substantially along a central axis of the cover member.

6. The device of claim 1 wherein the key activating projection is positioned substantially around a perimeter portion of the cover member.

7. The device of claim 1 wherein the cover members are resilient collapsible dome-shaped members, each of the cover members being movable from a raised position to a collapsed position when a selected force is applied to the cover member and being biased toward the raised position.

8. The device of claim 1 wherein the cover members include a top-side and collapsible sidewalls connected to the top side.

9. The device of claim 1 wherein the cover members are movable between raised and collapsed positions and are biased toward the raised position.

10. The device of claim 1 wherein the keypad-overlay is a sheet of molded thermoplastic material.

11. An electronic device, comprising:

a plurality of signal input members with key indicia that identity key strokes usable in operation of the electronic device;

a keypad-overlay removably positioned adjacent to the signal input members, the keypad-overlay having a plurality of translucent cover members each positioned over respective key indicia with the key indicia being visible to a user through a respective translucent cover member, the cover members having tactile indicators providing a tactile indication to a user when a respective cover member has been depressed a selected distance to accomplish a key stroke, each of the cover members being a convex member with an interior area and a key-activating portion in the interior area, the key-activating portion being positioned to engage a selected key when the respective cover member has been moved to accomplish the key stroke.

12. The electronic device of claim 11 wherein the key indicia is on a display and the keypad-overlay is positioned adjacent to the display.

13. The electronic device of claim 11, further comprising a touch-sensitive screen and the key indicia are displayed on the touch-sensitive screen, the keypad-overlay is removably positioned on the touch-sensitive screen.

14. The electronic device of claim 11 wherein the cover members are transparent.

15. The electronic device of claim 11 wherein the cover members are resilient collapsible dome-shaped members, each of the cover members being movable from a raised position to a collapsed position when a selected force is applied to the respective cover member.

16. The electronic device of claim 11 wherein the key-activating portion is positioned substantially along a central axis of a respective cover member.

17. The electronic device of claim 11 wherein the key-activating portion is positioned substantially adjacent to an outer perimeter portion of a respective cover member.

18. The electronic device of claim 11 wherein the key-activating portion is spaced substantially concentrically about a central axis of a respective cover member.

19. A keypad-overlay for use with a hand-held electronic device having a housing with a plurality of electronic components therein, a display coupled to the housing, and a plurality of key indicia identifying key strokes usable in operation of the electronic components, comprising a web portion removably positionable adjacent to the key indicia, and a plurality of translucent cover members connected to the web portion, each of the cover members being positioned over a respective key with the key being visible to an operator through the respective cover member, the cover members having tactile indicators configured to provide a tactile indication to an operator that the respective cover member has been depressed a selected distance to accomplish a key stroke during operation of the electronic components, the respective cover member having a key-activating protrusion positioned to engage the respective key when the respective cover member is moved to accomplish the key stroke.

20. The keypad-overlay of claim 19 wherein the plurality of key indicia are on the display and the keypad-overlay is positioned adjacent to the display.

21. The keypad-overlay of claim 19 wherein the cover members are resilient collapsible dome-shaped members, each of the cover members being movable from a raised position to a collapsed position when a selected force is applied to the respective cover member and each of the cover members is biased to the raised position.

22. The keypad-overlay of claim 19 wherein the key-activating protrusion is positioned substantially along the axis of the respective cover member.

23. The keypad-overlay of claim 19 wherein the web portion is integrally connected to the cover members.

24. The keypad-overlay of claim 19 wherein the keypad-overlay is a disposable molded sheet of thermoplastic material.

25. The keypad-overlay of claim 19, wherein each of the cover members includes a top side and collapsible sidewalls connected to the top-side.

26. The keypad-overlay of claim 19 wherein the respective cover member is movable between raised and collapsed positions, and the cover members includes collapsible sidewalls that provide the tactile indication to the user when the respective cover member moves toward the collapsed position.

27. The keypad-overlay of claim 19 wherein the key-activating protrusion is positioned substantially around a perimeter portion of the respective cover member.

28. The keypad-overlay of claim 19 wherein the key-activating protrusion is a compressible member.

29. The keypad-overlay of claim 19 wherein each of the cover members is movable between raised and collapsed positions, and the cover member includes a biasing member that biases the respective cover member toward the raised position.

\* \* \* \* \*